United States Patent [19]

Chundury et al.

[11] Patent Number: 5,317,059
[45] Date of Patent: May 31, 1994

[54] IMPACT-RESISTANT POLYMER BLENDS OF OLEFIN POLYMERS, POLYAMIDES, AND TERPOLYMER COMPATIBILIZERS

[75] Inventors: Deenadayalu Chundury, North Royalton, Ohio; Bernard G. J. Bitsch, Chantilly, France

[73] Assignee: Ferro Corporation, Cleveland, Ohio

[21] Appl. No.: 550,733

[22] Filed: Jul. 9, 1990

[51] Int. Cl.$^5$ ............................................. C08L 77/00
[52] U.S. Cl. ...................................... 525/66; 525/179
[58] Field of Search .................................. 525/179, 66

[56] References Cited

U.S. PATENT DOCUMENTS

| | | | |
|---|---|---|---|
| 3,113,986 | 10/1963 | Breslow et al. | 260/683.9 |
| 3,251,905 | 5/1966 | Zelinski | 260/879 |
| 3,390,207 | 6/1968 | Mass et al. | 260/879 |
| 3,598,887 | 8/1971 | Darcy et al. | 260/879 |
| 3,639,521 | 2/1972 | Hsieh et al. | 260/880 |
| 4,208,356 | 6/1980 | Fukawa et al. | 525/89 |
| 4,219,627 | 8/1980 | Halasa et al. | 525/89 |
| 4,226,952 | 10/1980 | Halasa et al. | 525/192 |
| 4,427,828 | 1/1984 | Herzenrother et al. | 525/66 |
| 4,578,429 | 3/1986 | Garzen et al. | 525/291 |
| 4,647,509 | 3/1987 | Wallace et al. | 428/474.9 |
| 4,657,970 | 4/1987 | Shiraki et al. | 525/57 |
| 4,795,782 | 1/1989 | Lutz et al. | 525/66 |
| 4,849,471 | 7/1989 | Saito et al. | 525/66 |
| 5,070,145 | 12/1991 | Guerdoux | 525/179 |
| 5,073,590 | 12/1991 | Abe et al. | 524/449 |
| 5,179,164 | 1/1993 | Lausberg et al. | 525/179 |

OTHER PUBLICATIONS

Ide and Hasegawa, J. Appl. Polym. Sci., 18, 963 (1974).
Chen et al, Polym. Engng. Sci., 28 69 (1988).
Park et al, Eur. Polym. J., vol. 26, 1-8 (1981).

*Primary Examiner*—Ana L. Carrillo
*Attorney, Agent, or Firm*—Renner, Otto, Boisselle & Sklar

[57] ABSTRACT

Blended polymer compositions are described which comprise (I) from about 1% to about 98% by weight of at least one olefin polymer;

(II) from about 1% to about 98% by weight of at least one polyamide;

(III) an effective amount of a compatibilizing agent which comprises at least one terpolymer of an alpha-olefin, at least one acrylic ester, and an alpha,beta-olefinically unsaturated dicarboxylic acid reagent, or a glycidyl acrylate; and (IV) from 0 to about 25% by weight of at least one auxiliary compatibilizing agent selected from the group consisting of (IVa) at least one selectively hydrogenated block copolymer of a vinyl aromatic hydrocarbon and a conjugated diene to which has been grafted, an alpha,beta-olefinically unsaturated carboxylic acid reagent;

(IVb) at least one polymer which is the product of the reaction of an alpha-olefin polymer and an alpha,-beta-olefinically unsaturated carboxylic acid reagent; and (IVc) a mixture of (III) and (IVa) and/or (IVb) reacted in the presence of a radical initiator provided that when the blended polymer contains one or more of the auxiliary compatibilizing agents (IVa) or (IVb), the blended polymer is free of other polymers of vinyl aromatic hydrocarbons.

27 Claims, No Drawings

IMPACT-RESISTANT POLYMER BLENDS OF OLEFIN POLYMERS, POLYAMIDES, AND TERPOLYMER COMPATIBILIZERS

FIELD OF THE INVENTION

This invention relates generally to polymer blends which are polymeric compositions comprising a mixture of an olefin polymer, a polyamide, and at least one compatibilizer which is a terpolymer.

BACKGROUND OF THE INVENTION

Thermoplastic polyamides such as nylon 6,6, have been widely used in the formation of mechanical parts and electrical parts for which excellent mechanical characteristics, high heat resistance and good durability are required. Although polyamides have good heat resistance and high mechanical strength, they are deficient in that the notched impact resistance and moisture resistance are poor. The impact resistance of the polyamides can be improved by blending them with another polymer. However, in general, physical blending of polymers does not provide a complete solution to the impact properties of polyamides because the polymers which improve the impact resistance of the thermoplastic polyamides are generally immiscible with the polyamides which results in poor adhesion between the polymers of the blend. As a result, interfaces between blend component domains are areas of weaknesses resulting in mechanical failure.

It is difficult, for example, to obtain a good dispersion of a combination of a polar polymer such as a thermoplastic polyamide with a non-polar polymer such as a polyolefin. It is known that the addition of a graft or block copolymer of similar chemical structure to the blend components can improve the quality of the dispersion. These copolymer additives, generally referred to as compatibilizers, are often added as a third component to the blend. Maleic anhydride grafted polypropylene has been suggested as a compatibilizer for polypropylene/nylon blends by Ide and Hasegawa, *J. Appl. Polym. Sci.*, 18, 963 (1974). The compatibilization of polyethylene/polyamide blends with maleic anhydride grafted polypropylene has been reported by Chen et al in *Prym. Engng. Sci.*, 28, 69 (1988). These and similar blends have been studied, and the results reported by Park et al in *Eur. Polym. J.*, Vol. 26, No. 2, pp. 131–136, 1990.

It has been previously proposed to increase the impact strength of polyamides by the addition of modified block copolymers. For example, Hergenrother in U.S. Pat. No. 4,427,828, discloses blends of thermoplastic polyamide with a modified block copolymer.

Another deficiency of the polyamides is their tendency to absorb water which results in the degradation of its desirable properties. The blending of polyolefins with polyamides has been suggested as a method for decreasing the water absorption for such a blend since a portion of the polyamide which absorbs water would be replaced by a polyolefin which is generally hydrophobic. However, attempts to improve the impact strength of polyamides with polyolefins have generally been unsuccessful because the polyamides were incompatible with the polyolefins.

U.S. Pat. No. 4,795,782 (Lutz et al) describes a polymer blend reported to exhibit improved impact resistance, and this polymer composition comprises a polyamide, a functionalized polyolefin and a functionalized elastomer. The functionalized polyolefins are obtained by reacting a polyolefin with an unsaturated mono- or polycarboxylic acid or derivative thereof. Suitable unsaturated mono- or polycarboxylic acids include maleic acid, maleic anhydride, fumaric acid, etc. The functionalized elastomers described in U.S. Pat. No. 4,795,782 are generally functionalized selectively hydrogenated block copolymers of conjugated dienes and vinyl aromatic compounds. The block copolymers are functionalized by grafting the copolymers with a mono- or polycarboxylic acid compound such as maleic acid, maleic anhydride, fumaric acid, etc. Other monomers which are utilized for introducing the functionality include vinyl monomers such as acrylamide, acrylonitrile, monovinyl aromatic compounds (i.e., styrene), vinyl esters, vinyl ethers, etc.

U.S. Pat. No. 4,657,970 (Shiraki et al) describes polymer compositions comprising at least one thermoplastic polymer including polyamides, thermoplastic polyesters, thermoplastic polyurethanes, vinyl alcohol polymers, etc., and at least one modified block copolymer of a monovinyl-substituted aromatic hydrocarbon polymer block A and at least one olefin compound polymer block B, to which has been grafted at least one molecular unit containing at least one member selected from a carboxylic acid group and groups derived therefrom. The modified copolymers and compositions described by Shiraki are reported to have excellent impact resistance, adhesion, paint adhesion, weatherability, resistance to aging, transparency, etc.

It is known that incompatibility problems may be overcome through the use of a compatibilizing agent. A compatibilizing agent is a material which, on a molecular scale, has particular regions which are compatible with each of the incompatible constituent polymers. Such compatibilizing agents typically surround one polymeric phase providing a chemical and/or physical bridge to the other polymeric phase. Insomuch as portions of the compatibilizing agent are compatible with each of the constituent polymers, the bonding between the two incompatible polymeric phases is effectively enhanced through this intermediate compatibilizing phase. Such a system of incompatible polymers coupled by a compatibilizing agent results in a material which advantageously combines the more desirable properties of the constituent polymers. Lindsey et al, *J. Appl. Polymer Sci.*, Vol. 26, 1–8 (1981) describe a method of reclaiming mixed immiscible polymers by employing a compatibilizing agent. The system studied was a high density polyethylene (HDPE) and polystyrene (PS) and a styrene-ethylene-butene-1-styrene (SEBS) copolymer (a linear triblock copolymer) as the compatibilizing agent. These ternary blends exhibited a considerable improvement in the balance of mechanical properties over a binary blend of high density polyethylene and polystyrene.

U.S. Pat. No. 4,647,509 discloses a multilayer thermoformable packaging material comprising a first layer of (a) a vinylidene chloride polymer, (b) an incompatible polymer, e.g., polyesters and nylons, and (c) a compatibilizing agent, and a second layer of (a) a blend of an olefin polymer, a styrenic polymer, and a compatibilizing polymer, and (b) scrap material produced from the first and second layers. The compatibilizing polymers for the second layer are preferably block copolymers of olefins and styrene such as copolymers of styrene-butadiene, styrene-butadiene-styrene, styrene-isoprene, etc.

SUMMARY OF THE INVENTION

Blended polymer compositions are described which comprise
(I) from about 1% to about 98% by weight of at least one olefin polymer;
(II) from about 1% to about 98% by weight of at least one polyamide;
(III) an effective amount of a compatibilizing agent which comprises at least one terpolymer of an alpha-olefin, an acrylic ester, and an alpha,beta-olefinically unsaturated dicarboxylic acid reagent, or a glycidyl acrylate; and
(IV) from 0 to about 25% by weight of at least one auxiliary compatibilizing agent selected from the group consisting of
  (IVa) at least one selectively hydrogenated block copolymer of a vinyl aromatic hydrocarbon and a conjugated diene to which has been grafted, an alpha,beta-olefinically unsaturated carboxylic acid reagent;
  (IVb) at least one polymer which is the product of the reaction of an alpha-olefin polymer and an alpha,-beta-olefinically unsaturated carboxylic acid reagent; and
  (IVc) a mixture of (III) and (IVa) and/or (IVb) reacted in the presence of a radical initiator;
provided that when the blended polymer contains one or more of the auxiliary compatibilizing agents (IVa) or (IVb), the blended polymer is free of other polymers of vinyl aromatic hydrocarbons.

DESCRIPTION OF THE PREFERRED EMBODIMENTS

(I) The Olefin Polymers

One of the essential components of the blended polymer compositions of the present invention is at least one olefin polymer, and in one embodiment, the olefin polymer is present in the blended polymer composition in amounts of from 1% to about 98% by weight, and more often at least about 30% by weight and up to about 90% by weight. In another embodiment, the polymer compositions of the present invention will contain from about 70% to about 90% by weight of the olefin polymer.

The olefin polymers employed in the blends of the present invention generally are semi-crystalline or crystallizable olefin polymers including homopolymers, copolymers, terpolymers, or mixtures thereof, etc., containing one or more monomeric units. Polymers of alpha-olefins or 1-olefins are preferred in the present invention, and these alpha-olefins may contain from 2 to about 20 carbon atoms. Alpha-olefins containing 2 to about 6 carbon atoms are preferred. Thus, the olefin polymers may be derived from olefins such as ethylene, propylene, 1-butene, 1-pentene, 4-methyl-1-pentene, 1-octene, 1-decene, 4-ethyl-1-hexene, etc., or mixtures of two or more of these olefins. Examples of particularly useful olefin polymers include low-density polyethylene, high-density polyethylene, linear low density polyethylene, ultra low density polyethylene, polypropylene (including isotactic polypropylene), (high and low density) poly(1-butene), poly(4-methyl-1-pentene), ultra low molecular weight polyethylene, ethylene-based ionomers, poly(4-methyl-1-pentene), ethylene-propylene copolymers, ethylene-propylene-diene copolymers (EPDM) copolymers of ethylene and/or propylene with other copolymerizable monomers such as ethylene-1-butylene copolymer, ethylene-vinyl acrylate copolymer, ethylene-ethyl acetate copolymer, propylene-4-methyl-1-pentene copolymer, ethylene-vinyl acetate, ethylene vinyl alcohol, ethylene acrylic elastomer such as ethylene-methyl acrylate-acrylic acid terpolymers, etc. Halogenated olefins, polymers and copolymers may also be used in this invention.

The number average molecular weight of the polyolefins is preferably above about 10,000 and more preferably above about 50,000. In addition, it is preferred in one embodiment that the apparent crystalline melting point be above about 75° C. and preferably between about 75° C. and about 250° C. Most commercial polyethylenes have a number average molecular weight of from about 50,000 to about 500,000. The olefin polymers useful in preparing the polymer blends of the present invention are well-known to those skilled in the art and many are available commercially. The olefin polymers may be homopolymers, impact copolymers, block copolymers, random copolymers, thermoplastic olefinic elastomers (TPO), etc., or mixtures thereof. Polyethylene and polypropylene are preferred olefin polymers. High density polyethylenes such as Phillips 6001, Cain's 7040 and Soltex G5012, and polypropylene homopolymers such as Himont's Profax 6523, Shell's 7C06 or Exxon's PD7132 and 7163, or Aristich's 4040F (polypropylene-ethylene copolymers) are particularly preferred.

(II) Polyamide Resins

The blended polymer compositions of the present invention contain from about 1 to about 98% by weight of at least one polyamide resin, and preferably, the polyamide resin has a number average degree of polymerization of at least 100 or a number average molecular weight of at least about 5000. In more preferred embodiments, the blended polymer compositions of the present invention will contain from about 5% to about 60% by weight of the polyamide and more often from about 10% to about 20% by weight of the polyamide. The polyamides provide the blended polymer compositions of the present invention with desirable properties such as strength and stiffness.

The polyamide resins useful in the blended polymer compositions of the present invention include a variety of polyamide resins including semi-crystalline and amorphous or transparent polyamides. These polyamide resins have been commonly referred to as nylons.

The polyamide resins can be produced by condensation of equimolar amounts of a saturated dicarboxylic acid containing from 4 to 12 carbon atoms with a diamine in which the diamine contains from about 4 to about 16 carbon atoms. Alternatively, the dicarboxylic acids utilized to form the nylons may be aromatic dicarboxylic acids such as isophthalic acid or terephthalic acid. Examples of aliphatic saturated dicarboxylic acids include sebacic, octadecanoic acid, sebacic acid, azelaic acid, undecanedioic acid, glutaric acid, pimelic acid, and especially adipic acid.

Examples of diamines which can be reacted with dicarboxylic acids to form nylons include diamines such as tetramethylenediamine, pentamethylenediamine, octamethylenediamine, decamethylenediamine, hexadecamethylenediamine, and in particular, hexamethylenediamine. Examples of aromatic amines which can be utilized include para-phenylenediamine and 4,4'-diaminodiphenylsulfone.

Polyamide resins also can be produced by ring-opening polymerization of a cyclic lactam. Excess diamine can be employed to provide an excess of amine end groups over carboxyl end groups in the polyamide. Examples of specific polyamides which are useful in the latter compositions of the present invention include polytetramethylene adipamide (nylon 4,6), polyhexamethylene adipamide (nylon 6,6), polyhexamethylene azelamide (nylon 6,9), polyhexamethylene sebacamide (nylon 6,10), polyhexamethylene dodecanoamide (nylon 6,12), the polyamide produced by ring opening of lactams such as polycaprolactam, polybutyrolactam, polypivalolactam, polylauriclactam, poly-11-aminoundecanoic acid, bis(paraminocyclohexyl)methane dodecanoamide, etc.

It is also possible to utilize polyamides prepared by copolymerization of two or more of the above polymers or terpolymerization of the above polymers or their components. For example, a suitable polyamide is an adipic isophthalic acid, hexamethylene diamine copolymer. Other copolymers include nylon-6/nylon-66 and nylon-6/nylon-12.

As noted earlier, transparent or amorphous polyamides are also useful in the polymer blends of the present invention. The amorphous or transparent polyamides are also prepared by condensation of a dicarboxylic acid with a diamine, but the particular dicarboxylic acid and diamine combinations are selected to provide polyamides which are amorphous or transparent. Transparent polyamides are commercially available from a variety of sources under various tradenames. For example, Ultramid K1297/2 (formerly Dynamit Nobel's Trogamid K4601) is a transparent polyamide available from BASF. Transparent polyamides available under the trade designations PA7030 and 5050 are available from Dow Chemical Company.

Although polytetramethylene adipamide was known to W. H. Carouthers many years ago, the polyamide was not commercialized because of the lack of an inexpensive source of the required 1,4-diaminobutane. As a result of a recent new route to the synthesis of 1,4-diaminobutane, and because of the outstanding physical characteristics of these polyamides including tensile strength, impact strength and abrasion resistance, nylon 4,6 is one preferred example of a polyamide suitable for use in the blended polymer compositions of the present invention.

The polyamides which generally have a number average molecular weight of at least about 200 up to about 30,000 although in one embodiment, it is preferred to utilize polyamides having a number average molecular weight of at least 5000. The melting points of the useful polyamides range from about 150° C. to about 280° C. It is preferred to utilize polyamides which are linear polymers with a melting point in excess of about 200° C. In addition to the use of copolymers, the blended polymer compositions of the present invention may also contain a mixture of two or more of the above-described polyamides.

III. Terpolymer Compatibilizing Agents

The blended polymer compositions of the present invention comprising the alpha-olefin polymer and the polyamide are compatibilized in accordance with the present invention by a terpolymer which is effective to compatibilize the polymer mixture. The amount of the terpolymer compatibilizer incorporated into the polymer blends of the present invention may vary from about 1% to about 35% by weight based on the combined weight of the polymer blend. In another embodiment, the polymer blends of the present invention contain from about 1 to about 10%, more often from about 2.5 to about 7.5% by weight of the terpolymer compatibilizer mixture.

The compatibilizer which is required in the polymer blends of the present invention is a terpolymer of an olefin, acrylic ester and either a dicarboxylic acid reagent or a glycidyl acrylate. In one embodiment, the terpolymer will comprise from about 60% to about 94% by weight of the olefin, from about 5% to about 40% by weight of the acrylic ester, and from about 1% to about 10% of the dicarboxylic acid reagent or a glycidyl acrylate.

The olefins used in the preparation of the terpolymers (III) are alpha-olefins, and any of the alpha-olefins described as being useful in preparing the alpha-olefin polymers (I) described above can be utilized in the formation of the terpolymers (III). In one preferred embodiment, the alpha-olefins contain from 2 to about 6 carbon atoms, and more preferably, the alpha-olefin is ethylene, propylene or a mixture of ethylene and propylene.

The acrylic esters used in the formation of the terpolymer (III) are characterized by the formula

$$CH_2=C(R)COOR'$$

wherein R is hydrogen, or an alkyl group containing 1 to 4 carbon atoms such as a methyl or ethyl group, and R' is an alkyl group containing from 1 to about 6 carbon atoms. Specific examples of esters characterized by the above formula which are useful in forming the terpolymers (III) include methyl acrylate, ethyl acrylate, butyl acrylate, methyl methacrylate, ethyl methacrylate, ethyl ethacrylate, etc.

The third component utilized in the preparation of the terpolymers (III) may be at least one alpha, beta-olefinically unsaturated dicarboxylic acid reagent. The dicarboxylic acid reagents include the dicarboxylic acids, anhydrides, imides, partial esters, metal salts, etc., and any of the dicarboxylic acid reagents described as being useful in the preparation of the block copolymers (IVa) below. In one embodiment, the preferred dicarboxylic acid reagent is maleic anhydride.

The third monomer used in the preparation of terpolymer (III) also may be a glycidyl acrylate such as represented by the formula

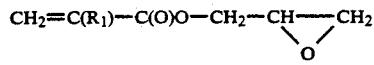

wherein $R_1$ is hydrogen or a lower alkyl group of 1 to 6 carbon atoms. Preferably $R_1$ is hydrogen or a methyl or ethyl group. Specific glycidyl acrylates include glycidyl acrylate, glycidyl methacrylate and glycidyl ethacrylate.

Specific examples of monomer mixtures which can be utilized to form terpolymers useful as compatibilizers in the present invention include ethylene-methyl acrylate-maleic anhydride; ethylene-ethyl acrylate-maleic anhydride; ethylene-butyl acrylate-maleic anhydride; propylene-methyl acrylate-maleic anhydride; propylene-ethyl acrylate-maleic anhydride; ethylene-methyl acrylate-glycidyl methacrylate; ethylene-methyl acrylate-glycidyl acrylate; etc.

The terpolymers which are useful as one of the compatibilizers in the polymer blends of the present invention can be prepared by known techniques, and some are available commercially. For example, ORKEM (formerly CdF Chimie) offers a number of such terpolymers under the general trade designation Lotader TM. Specific examples include Lotader TM 3200 (formerly LX4110) prepared from a mixture comprising about 88% by weight of ethylene, 9% by weight of butyl acrylate and 3% of maleic anhydride. This terpolymer has a melt index of 5 and an acid index is determined by titration of 19 mg KOH/g, a melting point of 107° C. Lotader TM 6600 comprises about 70% of ethylene, 27% of an acrylic ester and about 3% maleic anhydride. This terpolymer has an acid index of 17 mg KOH/g. Lotader TM 4700 which comprises about 62.5% ethylene, 32% of an acrylic ester and about 1.5% of maleic anhydride has a melt index of about 40, a melting point of 70° C. and an acid index of 17 mg KOH/g. Lotader TM AH8660 is a terpolymer of ethylene, an acrylic ester, and glycidyl methacrylate with a melting point of 79° C. and a vicat softening point (ASTM D1525, 1 KG) of 34° C. Additional examples of terpolymers include terpolymers comprising: 77% ethylene/20% ethyl acrylate/3% maleic anhydride; 89.5% ethylene, 7% ethyl acrylate and 3.5% maleic anhydride; and 70% ethylene/28.5% ethyl acrylate/and 1.5% maleic anhydride.

IV. Auxiliary Compatibilizing Agents

In addition to the required terpolymer compatibilizing agent (III), the polymer blends of the invention may also be characterized as containing from 0 to 25% by weight of at least one auxiliary compatabilizing agent selected from the group consisting of
(IVa) at least one selectively hydrogenated block copolymer of a vinyl aromatic hydrocarbon and a conjugated diene to which has been grafted, an alpha,-beta-olefinically unsaturated carboxylic acid reagent;
(IVb) at least one polymer which is the product of the reaction of an alpha-olefin polymer and an alpha,-beta-olefinically unsaturated carboxylic acid reagent; and
(IVc) a mixture of (III) and (IVa) and/or (IVb) reacted in the presence of a radical initiator;
provided that when the blended polymer contains one or more of the auxiliary compatibilizing agents (IVa) or (IVb), the blended polymer is free of other polymers of vinyl aromatic hydrocarbons.

IVa. Selectively Hydrogenated Block Copolymer of a Vinyl Aromatic Hydrocarbon and a Conjugated Diene Grafted With an Alpha Olefinically Unsaturated Carboxylic Acid Reagent One of the optional auxiliary compatibilizing agents which may be utilized in the present invention is a product which is obtained by grafting an alpha,beta-olefinically unsaturated monocarboxylic or dicarboxylic acid reagent onto selectively hydrogenated block copolymers of vinyl aromatic hydrocarbons and conjugated dienes.

The block copolymers of vinyl aromatic hydrocarbons and conjugated dienes which may be utilized in include any of those which exhibit elastomeric properties and those which have 1,2-microstructure contents prior to hydrogenation of from about 7% to about 100%. The block copolymers may be diblock, triblock, multiblock, starblock, polyblock or graftblock copolymers. Throughout this specification and claims, the terms diblock, triblock, multiblock, polyblock, and graft or grafted-block with respect to the structural features of block copolymers are to be given their normal meaning as defined in the literature such as in the Encyclopedia of Polymer Science and Engineering, Vol. 2, (1985) John Wiley & Sons, Inc., New York, pp. 325–326, and by J. E. McGrath in *Block Copolymers, Science Technology*, Dale J. Meier, Ed., Harwood Academic Publishers, 1979, at pages 1–5.

Such block copolymers may contain various ratios of conjugated dienes to vinyl aromatic hydrocarbons including those containing up to about 60% by weight of vinyl aromatic hydrocarbon. Accordingly, multi-block copolymers may be utilized which are linear or radial symmetric or asymmetric and which have structures represented by the formulae A-B, A-B-A, A-B-A-B, B-A-B, $(AB)_{0,1,2...}$ BA, etc., wherein A is a polymer block of a vinyl aromatic hydrocarbon or a conjugated diene/vinyl aromatic hydrocarbon tapered copolymer block, and B is a polymer block of a conjugated diene.

The block copolymers may be prepared by any of the well-known block polymerization or copolymerization procedures including sequential addition of monomer, incremental addition of monomer, or coupling techniques as illustrated in, for example, U.S. Pat. Nos. 3,251,905; 3,390,207; 3,598,887; and 4,219,627. As well known, tapered copolymer blocks can be incorporated in the multi-block copolymers by copolymerizing a mixture of conjugated diene and vinyl aromatic hydrocarbon monomers utilizing the difference in their copolymerization reactivity rates. Various patents describe the preparation of multi-block copolymers containing tapered copolymer blocks including U.S. Pat. Nos. 3,251,905; 3,639,521; and 4,208,356, the disclosures of which are hereby incorporated by reference.

Conjugated dienes which may be utilized to prepare the polymers and copolymers are those containing from 4 to about 10 carbon atoms and more generally, from 4 to 6 carbon atoms. Examples include from 1,3-butadiene, 2-methyl-1,3-butadiene (isoprene), 2,3-dimethyl-1,3-butadiene, chloroprene, 1,3-pentadiene, 1,3-hexadiene, etc. Mixtures of these conjugated dienes also may be used. The preferred conjugated dienes are isoprene and 1,3-butadiene.

Examples of vinyl aromatic hydrocarbons which may be utilized to prepare the copolymers include styrene and the various substituted styrenes such as o-methylstyrene, p-methylstyrene, p-tert-butylstyrene, 1,3-dimethylstyrene, alpha-methylstyrene, beta-methylstyrene, p-isopropylstyrene, 2,3-dimethylstyrene, o-chlorostyrene, p-chlorostyrene, o-bromostyrene, 2-chloro-4-methylstyrene, etc. The preferred vinyl aromatic hydrocarbon is styrene.

Many of the above-described copolymers of conjugated dienes and vinyl aromatic compounds are commercially available. The number average molecular weight of the block copolymers, prior to hydrogenation, is from about 20,000 to about 500,000, preferably from about 40,000 to about 300,000.

The average molecular weights of the individual blocks within the copolymers may vary within certain limits. In most instances, the vinyl aromatic block will have a number average molecular weight in the order of about 2000 to about 125,000, and preferably between about 4000 and 60,000. The conjugated diene blocks either before or after hydrogenation will have number average molecular weights in the order of about 10,000 to about 45,000 and more preferably from about 35,000 to 150,000.

Also, prior to hydrogenation, the vinyl content of the conjugated diene portion is from about 10 to about 80%, and the vinyl content is preferably from about 25 to about 65%, particularly 35 to 55% when it is desired that the modified block copolymer exhibit rubbery elasticity. The vinyl content of the block copolymer can be measured by means of nuclear magnetic residence.

Specific examples of diblock copolymers include styrene-butadiene, styrene-isoprene, and the hydrogenated derivatives thereof. Examples of triblock polymers include styrene-butadiene-styrene, styrene-isoprene-styrene, alpha-methylstyrene-butadiene-alpha-methylstyrene, and alpha-methylstyrene-isoprene-alpha-methylstyrene.

The selective hydrogenation of the block copolymers may be carried out by a variety of well known processes including hydrogenation in the presence of such catalysts as Raney nickel, noble metals such as platinum, palladium, etc., and soluble transition metal catalysts. Suitable hydrogenation processes which can be used are those wherein the diene-containing polymer or copolymer is dissolved in an inert hydrocarbon diluent such as cyclohexane and hydrogenated by reaction with hydrogen in the presence of a soluble hydrogenation catalyst. Such procedures are described in U.S. Pat. Nos. 3,113,986 and 4,226,952, the disclosures of which are incorporated herein by reference. Such hydrogenation of the block copolymers which are carried out in a manner and to extent as to produce selectively hydrogenated copolymers having a residual unsaturation content in the polydiene block of from about 0.5 to about 20% of their original unsaturation content prior to hydrogenation.

In one embodiment, the conjugated diene portion of the block copolymer is at least 90% saturated and more often at least 95% saturated while the vinyl aromatic portion is not significantly hydrogenated. Particularly useful hydrogenated block copolymers are hydrogenated products of the block copolymers of styrene-isoprene-styrene such as a styrene-(ethylene/propylene)-styrene block polymer. When a polystyrene-polybutadiene-polystyrene block copolymer is hydrogenated, it is desirable that the 1,2-polybutadiene to 1,4-polybutadiene ratio in the polymer is from about 30:70 to about 70:30. When such a block copolymer is hydrogenated, the resulting product resembles a regular copolymer block of ethylene and 1-butene (EB). As noted above, when the conjugated diene employed as isoprene, the resulting hydrogenated product resembles a regular copolymer block of ethylene and propylene (EP). One example of a commercially available selectively hydrogenated is Kraton G-1652 which is a hydrogenated SBS triblock comprising 30% styrene end blocks and a midblock equivalent which is a copolymer of ethylene and 1-butene (EB). This hydrogenated block copolymer is often referred to as SEBS.

In another embodiment, the selectively hydrogenated block copolymer is of the formula $$B_n(AB)_oA_p$$

wherein
n=0 or 1;
o is 1 to 100;
p is 0 or 1;
each B prior to hydrogenation is predominantly a polymerized conjugated diene hydrocarbon block having a number average molecular weight of about 20,000 to about 450,000;
each A is predominantly a polymerized vinyl aromatic hydrocarbon block having a number average molecular weight of from about 2000 to about 115,000; the blocks of A constituting about 5% to about 95% by weight of the copolymer; and the unsaturation of the block B is less than about 10% of the original unsaturation. In other embodiments, the unsaturation of block B is reduced upon hydrogenation to less than 5% of its original value, and the average unsaturation of the hydrogenated block copolymer is reduced to less than 20% of its original value.

The block copolymers of the conjugated diene and the vinyl aromatic hydrocarbon described above are grafted with an alpha,beta-olefinically unsaturated monocarboxylic or dicarboxylic acid reagent. The carboxylic acid reagents include carboxylic acids per se and their functional derivatives such as anhydrides, metal salts, imides, esters, etc., which are capable of being grafted onto the selectively hydrogenated block copolymer. The grafted polymer will usually contain from about 0.2 to about 20%, and preferably from about 0.1 to about 10% by weight based on the total weight of the block copolymer and the carboxylic acid reagent of the grafted carboxylic acid.

The monobasic alpha,beta-olefinically unsaturated carboxylic acid reagents are carboxylic acids or derivation corresponding to the formula $$RCH{=}C(R_1)COOH$$

wherein R is hydrogen or a saturated aliphatic or alicyclic, aryl, alkaryl or heterocyclic group. Preferably, R is hydrogen or an alkyl group containing from 1 to about 10 carbon atoms. $R_1$ is hydrogen or an alkyl group containing from 1 to about 10 carbon atoms. The total number of carbon atoms in R and $R_1$ should not exceed 18 carbon atoms. Specific examples of useful monobasic carboxylic acids derivation include acrylic acid, methacrylic acid, cynamic acid, crotonic acid, acrylic anhydride, sodium acrylate, calcium acrylate and magnesium acrylate, etc. Examples of dicarboxylic acids and useful derivatives thereof include maleic acid, maleic anhydride, fumaric acid, mesaconic acid, itaconic acid, citraconic acid, itaconic anhydride, citraconic anhydride, monomethyl maleate, monosodium maleate, etc.

In order to promote the grafting of the carboxylic acid reagent to the hydrogenated block copolymer, free radical initiators are utilized, and these initiators usually are either peroxides of various organic azo compounds. The amount of initiator utilized generally from about 0.01% to about 5% by weight based on the combined weight of the combined copolymer and the carboxylic reagent. The amount of carboxylic acid reagent grafted onto the block copolymers can be measured by determining the total acid number of the product. The grafting reaction can be carried out by melt or solution mixing of the block copolymer and the carboxylic acid reagent in the presence of the free radical initiator.

The preparation of various selectively hydrogenated block copolymers of conjugated dienes and vinyl aromatic hydrocarbons which have been grafted with a carboxylic acid reagent is described in a number of patents including U.S. Pat. Nos. 4,578,429; 4,657,970; and 4,795,782, and the disclosures of these patents relating to grafted selectively hydrogenated block copolymers of conjugated dienes and vinyl aromatic compounds, and the preparation of such compounds are hereby incorporated by reference. U.S. Pat. No. 4,795,782 describes and gives examples of the preparation of the grafted block copolymers by the solution process and the melt process. U.S. Pat. No. 4,578,429 contains an example of grafting of Kraton G1652 (SEBS) polymer with maleic anhydride with 2,5-dimethyl-2,5-di(t-butylperoxy) hexane by a melt reaction in a twin screw extruder. (See Col. 8, lines 40–61.)

Examples of commercially available maleated selectively hydrogenated copolymers of styrene and butadiene include Kraton FG1901X from Shell, often referred to as a maleated selectively hydrogenated SEBS copolymer.

IVb. Reaction Product of Alpha-Olefin Polymer and Alpha-Beta Olefinically Unsaturated Carboxylic Acid Reagent The blended polymer compositions of the present invention optionally may contain the product of the reaction of at least one alpha-olefin polymer and an alpha,beta-olefinically unsaturated carboxylic acid reagent. When incorporated into the polymer blend compositions of the present invention, the reaction product (IVb) will be present in an amount of from about 0.01 to about 25% by weight based on the total weight of polymer composition. Preferably, the alpha-olefin polymer is derived from an aliphatic alpha-olefin such as ethylene, propylene, 1-butene, etc. The olefin polymers are preferably polyethylenes, polypropylenes or mixtures thereof. The number average molecular weight of the polyolefins utilized in the reaction with the carboxylic acid reagent is generally lower than the number average molecular weight of the polyolefins utilized as a major component in the blended polymer compositions of the present invention and described above as component (I). In one embodiment, the number average molecular weights of the polyolefins utilized in this component may range from about 2000 to about 10,000.

The amount of carboxylic acid reagent reacted with the polyolefin may range from about 0.2% to about 20% by weight based on the weight of the olefin polymer. More generally, the amount of acid reagent reacted with the polyolefin will be less than 10% and most often between 0.1 and 5% by weight. The alpha,-beta-olefinically unsaturated carboxylic acid reagents utilized to form the reaction product (IVb) may be any of the carboxylic acid reagents described above utilized in the grafting of the selected block copolymers in the formation of component (IVa). A particularly preferred alpha,beta-olefinically unsaturated carboxylic reagent is maleic acid. The reaction between the carboxylic acid reagent in the polyolefin can be effected in the same manner as the reaction described with respect to the preparation of the grafted block copolymers (IVa). Thus, the reaction can be conducted in solutions by a melt process in the presence of a free radical initiator.

An example of a commercially available maleic acid grafted polypropylene is Epolene E-43 wax from Eastman Chemical Products, Inc. Epolene E-43 has an acid number of 47 and an approximate number average molecular weight of 4500. Epolene C-16 and C-18 waxes are maleic acid grafted polyethylenes with approximate molecular weights of 8000 and 4000, respectively. Maleated ethylene-propylene elastomers also are useful, and such elastomers are available from Exxon Chemical Company under identification numbers 99-10, 99-14 and 99-26. These copolymers contain 77%, 64% and 43% of ethylene, respectively, and the maleated products contain 0.76%, 0.56% and 0.35% of maleic acid or anhydride, respectively.

IVc. Mixture of (III) and (IVa) and/or (IVb) Reacted in the Presence of a Radical Iniator The optional auxiliary compatibilizing agents which may be utilized in the present invention include reacted mixtures comprising one or more of the compatibilizing agents (III) identified above and one or more of the auxiliary compatibilizing agents (IIa) and (IVb) described above reacted in the presence of a radical catalyst. Examples of free radical catalysts include inorganic peroxide such as hydrogen peroxide and magnesium peroxide; organic peroxy compounds such as dialkyl peroxides (e.g., diethyl peroxide); alkyl hydrogen peroxides (e.g., tert-butyl hydrogen peroxide; diacyl peroxides; mixed diacyl peroxides; and salts of inorganic peracids such as ammonium persulfide, potassium persulfate, sodium perborate, etc. Other free radical generators include ultraviolet rays, gamma rays, electron beams, etc.

V. Fillers and Fibers

The blended polymer compositions of the present invention may, and generally do contain one or more fillers of the types used in the polymer art. Examples of fillers employed in a typical compounded polymer blend according to the present invention included talc, calcium carbonate, mica, wollastonite, dolomite, glass fibers, boron fibers ("Wyskers"), carbon fibers, carbon blacks, (conductive or non-conductive) pigments such as titanium dioxide, or mixtures thereof. Preferred fillers include commercially available talc such as R. T. Vanderbilt's Select-O-Sorb and glass fibers. The amount of filler and fibers included in the blended polymer compositions of the present invention may vary from about 1% to about 70% of the combined weight of polymer in filler. Generally, amounts of from 5% to 30% are utilized.

The fillers and fibers may be treated with coupling agents to improve the bond between the fillers and fibers to the resin. For example, the fillers can be treated with materials such as fatty acids (e.g., stearic acid), silanes, maleated polypropylene, etc. The amount of coupling agents used is an amount effective to improve the bond between the fillers and fibers with the resin. Other additives may be included in the polymer blends of the present invention to modify or to obtain desirable properties. For example, stabilizers and inhibitors of oxidative, thermal and ultraviolet light degradation may be included in the polymer blends as well as lubricants and mold release agents, colorants including dyes and pigments, nucleating agents, plasticizers, flame retardants, etc., may be included in the polymer blends.

The stabilizers can be incorporated into the composition at any stage in the preparation of the polymer blends, and preferably, the stabilizers are included early to preclude the initiation of degradation before the composition can be protected. The oxidative and thermal stabilizers useful in the polymer blends of the present invention include those used in addition polymers generally. They include, for example, up to about 1% by weight, based on the weight of the polymer blend, of Group I metal halides such as sodium, potassium, lithium and cuprous halides (e.g., chloride, bromide, and iodide), hindered phenols, hydroquinones, and various substituted derivatives of these materials and combinations thereof.

The ultraviolet light stabilizers may be included in amounts of up to about 2% by weight based on the weight of the polymer blend. Examples of ultraviolet light stabilizers include various substituted resorcinols, salicylates, benzotriazoles, benzophenones, etc.

Suitable lubricants and mold release agents may be included in amounts of up to about 1% by weight based on the weight of the polymer blend include materials such as stearic acid, stearic alcohol, stearic acid salts, stearamides, organic dyes such as nigrosine, pigments such as titanium dioxide, cadmium sulfide, carbon black, etc. The plasticizers which may be included in amounts of up to about 20% by weight based on the weight of the polymer blend include materials such as dioctylphthalate, bibenzylphthalate, butylbenzophthalate, hydrocarbon oils, sulfonamides such as paratoluene ethyl sulfonamides, n-butylbenzene sulfonamide, etc.

When the polymer blends of the present invention contain any of the auxiliary compatibilizers (IV), the blend is preferably free of other polymers and copolymers of vinyl aromatic hydrocarbons such as, for example, polymers and copolymers of styrene. In particular, the blends are free of copolymer of vinyl aromatic hydrocarbons and alpha,beta unsaturated carboxylic acid reagents such as maleic acid or maleic anhydride.

The blended polymer compositions of the present invention including the olefin polymer (I), the polyamide (II), the terpolymer compatibilizer (III), the optional auxiliary compatibilizers (IVa), (IVb), and (IVc), and other additives can be prepared by techniques well known to those skilled in the art. For example, a particularly useful procedure is to intimately mix the polymers using conventional mixing equipment such as a mill, a Banbury mixer, a Brabender Torque Rheometer, a single or twin screw extruder, continuous mixers, cokneaders from Buss, kneaders, etc. For example, the polymers may be intimately mixed in the form of granules and/or powder in a high shear mixer. One preferred process for preparing the blended polymers utilizes the Farrel Continuous Mixer (FCM CP-23). Short residence times and high shear are readily obtained in a CP-23. "Intimate" mixing means that the mixture is prepared with sufficient mechanical shear and thermal energy to produce a dispersed phase which is finely divided and homogeneously dispersed in the continuous or principal phase.

The blended polymer compositions of the present invention may be prepared by melt-blending at least about 1% to about 98% by weight of the olefin polymer (I), from about 1% to about 98% by weight of a polyamide resin (II), from about 1% to about 35% of the terpolymer (III) and up to 25% by weight of the auxiliary compatibilizers (IV). The polymer blends of the present invention are characterized as having improved impact strengths.

The blended polymer compositions of the present invention can be processed into shaped articles by extrusion, coextrusion, thermo-forming, blow-molding, injection-molding, compression-molding, calendering, laminating, stamping, pultrusion, etc. In particular, shaped articles can be prepared by thermoforming sheets of the blended polymer compositions of the present invention. The blended polymer compositions of the invention are recyclable.

Various features and aspects of the present invention are illustrated further in the examples that follow. While these examples are presented to show one skilled in the art how to operate within the scope of this invention, the examples are not to serve as a limitation on the scope of the invention since such scope is only defined in the claims.

Unless otherwise indicated in the following examples and elsewhere in the specification and claims, all parts and percentages are by weight, temperatures are in degrees Centigrade, and pressures are at or near atmospheric. The physical properties described in the following examples are measured in accordance with ASTM Standard Test Procedures as identified in the following Table I.

TABLE I

| Property | ASTM Method |
| --- | --- |
| Tensile Strength | D-638 |
| Elongation | D-638 |
| Flexural Strength | D-790 |
| Flexural Modulus (tangent) | D-790 |
| Izod Impact (notched) | D-256* |
| Izod Impact (unnotched) | D-256 |
| Gardner Impact | D-3209 |
| Heat Deflection Temp. | D-648 |
| Melt Flow Rate | D-1238** |

*Method A.
**Condition 230° C./2.16 Kg.

EXAMPLES 1-2

Blends of polypropylene (Himont Profax ™ 6523) Nylon 6 (Capron ™ 8200 HS) and terpolymer of ethylene, -acrylic ester-maleic anhydride (Lotader ™ 3200) are prepared as Examples 1 and 2. A 34 mm. Leistritz counter-rotating intermeshing twin screw extruder (L/D ratio=28:1) is used to prepare the blend at a melt temperature of about 480° F. The amounts of the polymers and terpolymers included in Examples 1 and 2 are summarized in Table II below. A control blend is prepared of polypropylene and Nylon 6 but containing no terpolymer.

The above blends are injection molded into test specimens. The make-up of the blends and some of their properties are summarized in Table II.

TABLE II

| Composition (% w) | Control A | Example 1 | Example 2 |
| --- | --- | --- | --- |
| Profax ™ 6523 | 80 | 77.5 | 75.0 |
| Capron ™ 8200 | 20 | 20 | 20.0 |
| Lotader ™ 3200 | 0 | 2.5 | 5.0 |
| Properties |  |  |  |
| Flexural Strength, psi | 7100 | 7500 | 7100 |
| Flexural Modulus, psi | 235,000 | 208,000 | 198,000 |
| HDT @ 66 psi, °F. | 103 | 91 | 94 |
| Gardner Impact, (RT) in. lb. | <2 | 117 | 87 |

EXAMPLES 3-6

The blended polymer compositions are prepared similar to blends of Example 1 with the exception that the polypropylene is PP RW 210, the Nylon 6 is commercially available as ASN-27, and the terpolymer compatibilizers are either Lotader ™ 3318 or Lotader ™ 8660. The Lotader ™ 3318 is a terpolymer of ethylene-acrylic ester-maleic anhydride having an acid index (mgKOH/g) of 11. The Lotader TM 8660 is a terpolymer of ethylene, acrylic ester and glycidyl methacrylate. The blend of Example 5 also contain Epsilon-Caprolactam. Some of the properties of the blends of Examples 3-6 are summarized in the following Table III.

TABLE III

| Composition (% w) | Example 3 | Example 4 | Example 5 | Example 6 |
|---|---|---|---|---|
| Polypropylene | 30 | 55 | 29 | 55 |
| Nylon 6 | 55 | 30 | 52 | 30 |
| Lotader TM 3318 | 15 | 15 | 14 | 0 |
| Lotader TM 8660 | 0 | 0 | 0 | 15 |
| Epsilon-Caprolactam | 0 | 0 | 5 | 0 |
| Properties |  |  |  |  |
| Flexural Strength, psi | 7977 | 4351 | 5946 | 2756 |
| Flexural Modulus, psi | 255,257 | 188,542 | 217,549 | 145,033 |
| Notched Impact at 23° C., ft. lb./in. | 3.222 | 1.836 | 4.871 | 2.623 |

EXAMPLES 7-8

Blends are prepared containing polypropylene, Nylon 6, terpolymer LX-3200 and a maleated SEBS block copolymer (Kraton G-1901X) in a manner described in Example 1. Control Example B is prepared containing only the polypropylene and a Nylon 6, and Control Example C is prepared containing polypropylene, Nylon 6 and the maleated SEBS block copolymer. The make-up of the blends and some of the properties of the molded test specimens are summarized in Table III.

TABLE III

| Composition (% w) | Control B | Control C | Example 7 | Example 8 |
|---|---|---|---|---|
| Profax TM 6523 (PP) | 80.0 | 77.5 | 77.5 | 75.0 |
| Capron TM 8200 HS (Nylon 6) | 20.0 | 20.0 | 20.0 | 20.0 |
| LX-3200 (terpolymer) | 0 | 0 | 2.5 | 2.5 |
| Kraton TM G1901X | 0 | 2.5 | 0 | 2.5 |
| Properties |  |  |  |  |
| Flexural Modulus, psi | 243,800 | 218,700 | 236,800 | 193,400 |
| Elongation at break, % | 17.2 | 175.8 | 36.5 | 217.3 |
| Gardner Impact, (RT) in. lb. | <2 | 229.6 | 60.3 | >320 |
| HDT @ 66 psi, °C. | 102 | 93 | 96 | 79 |
| Mold Shrinkage, in./in. % | 1.32 | 1.35 | 1.44 | 1.31 |

EXAMPLES 9 and 10

Blends are prepared in accordance with the present invention containing polypropylene, Nylon 6 and the terpolymer LX-3200. The blend of Example 10 also contained Exxon 99-26 which is the reaction product of an example of an auxiliary compatibilizing agent and which is a maleated ethylenepropylene elastomer containing about 0.35% by weight of maleic anhydride and about 43% ethylene (available commercially from the Exxon Chemical Company). The makeup of the blends and some of their properties are summarized in the following Table IV.

TABLE IV

| Composition (% w) | Control B | Control D | Example 9 | Example 10 |
|---|---|---|---|---|
| Profax TM 6523 (PP) | 80 | 75 | 75 | 75 |
| Capron TM 8200 HS (Nylon 6) | 20 | 20 | 20 | 20 |

TABLE IV-continued

| Composition (% w) | Control B | Control D | Example 9 | Example 10 |
|---|---|---|---|---|
| LX-3200 (terpolymer) | 0 | 0 | 5 | 2.5 |
| Exxton 99-26 | 0 | 5 | 0 | 2.5 |
| Properties |  |  |  |  |
| Flexural Modulus, psi | 243,800 | 218,900 | 210,500 | 201,100 |
| Elongation at break, % | 17.2 | 21.6 | 25.7 | 30.5 |
| Gardner Impact, in. lb. | <2 | 9.0 | 148.0 | 215.6 |
| HDT @ 66 psi, °C. | 102 | 98.0 | 88.0 | 94.5 |
| Mold Shrinkage, in./in. % | 1.32 | 1.23 | 1.46 | 1.35 |

EXAMPLE 11

A blend is prepared containing polypropylene, Nylon 6, LX-3200 and Epolene E-43, a maleated polypropylene wax. The makeup of the blend of Example 11 and some of its properties are summarized in the following Table V and compared to Control-B and other Control Blends E and F which do not contain the terpolymer LX-3200.

TABLE V

| Composition (% w) | Control B | Control E | Control F | Example 11 |
|---|---|---|---|---|
| Profax TM 6523 (PP) | 80 | 75 | 75 | 75 |
| Capron TM 8200 (Nylon 6) | 20 | 20 | 20 | 20 |
| LX-3200 (terpolymer) | 0 | 0 | 0 | 2.5 |
| Epolene TM E-43 | 0 | 5 | 2.5 | 2.5 |
| Kraton TM GF1901X | 0 | 0 | 2.5 | 0 |
| Properties |  |  |  |  |
| Flexural Modulus, psi | 243,800 | 248,700 | 216,700 | 232,000 |
| Elongation at break, % | 17.2 | 20.9 | 158.6 | 26.5 |
| Gardner Impact, in. lb. | <2 | <2 | 179.3 | 3.4 |
| HDT @ 66 psi, °C. | 102 | 93 | 76 | 96 |
| Mold Shrinkage, in./in. % | 1.32 | 1.32 | 1.27 | 1.29 |

EXAMPLES 12-13

In these examples, blends are prepared containing polypropylene, Nylon 6 and a terpolymer of ethylene, acrylic ester, and glycidyl methacrylate. The blend of Example 13 also contains Kraton TM GF1901X. The makeup of the blends and some of their properties are compared to the properties of Control-B, summarized in the following Table VI.

TABLE VI

| Composition (% w) | Control B | Example 12 | Example 13 |
|---|---|---|---|
| Profax TM 6523 (PP) | 80 | 75 | 75 |
| Capron TM 8200 (Nylon 6) | 20 | 20 | 20 |
| Lotader TM AH 8660 (terpolymer) | 0 | 5 | 2.5 |
| Kraton TM GF1901X | 0 | 0 | 2.5 |
| Properties |  |  |  |
| Flexural Modulus, psi | 243,800 | 163,000 | 175,000 |
| Elongation at break, % | 17.2 | 42.5 | 112.7 |
| Gardner Impact, in. lb. | <2 | 44.2 | 231.2 |
| HDT @ 66 psi, °C. | 102 | 73.5 | 77.0 |
| Mold Shrinkage, in./in. % | 1.32 | 1.22 | 1.32 |

EXAMPLES 14-15

Blends of Examples 14 and 15 contain polypropylene, Nylon 6 and Lotader TM 3200. The blend of Example 15 also contains auxiliary compatibilizers E-43 and Kraton TM GF1901X. The makeup of these blends and some of their properties, compared to Control Examples B and E are summarized in the following Table VII.

TABLE VII

| Composition (% w) | Control B | Control E | Example 14 | Example 15 |
|---|---|---|---|---|
| Profax TM 6523 (PP) | 80 | 75 | 75 | 75 |
| Capron TM 8200 (Nylon 6) | 20 | 20 | 20 | 20 |
| LX-3200 (terpolymer) | 0 | 0 | 5 | 2 |
| Epolene E-43 | 0 | 5 | 0 | 1 |
| Kraton TM GF1901X | 0 | 0 | 0 | 2 |
| Properties | | | | |
| Flexural Modulus, psi | 243,800 | 248,700 | 210,500 | 197,900 |
| Elongation at break, % | 17.2 | 20.8 | 25.7 | 168.8 |
| Gardner Impact, in. lb. | <2 | <2 | 148 | 306 |
| HDT @ 66 psi, °C. | 102 | 93 | 88 | 75 |
| Mold Shrinkage, in./in. % | 1.32 | 1.32 | 1.46 | 1.26 |

The blended polymer compositions of the present invention are useful for automotive, electrical, electronics, building, furniture, small appliances, and other applications.

While the invention has been explained in relation to its preferred embodiments, it is to be understood that various modifications thereof will become apparent to those skilled in the art upon reading the specification. Therefore, it is to be understood that the invention disclosed herein is intended to cover such modifications as fall within the scope of the appended claims.

We claim:

1. A blended polymer composition comprising:
   (I) from about 30% to about 90% by weight of at least one polypropylene or copolymer of ethylene and propylene;
   (II) from about 5% to about 25% by weight of at least one polyamide;
   (III) from about 0.1% to about 25% of a compatibilizing agent which comprises at least one terpolymer of an alpha-olefin, an acrylic ester, and an alpha,-beta-olefinically unsaturated dicarboxylic acid reagent, or a glycidyl acrylate; and
   (IV) from 0.1% to about 10% by weight of at least one auxiliary compatibilizing agent selected from at least one selectively hydrogenated block copolymer of a vinyl aromatic hydrocarbon and a conjugated diene to which has been grafted, an alpha,-beta-olefinically unsaturated carboxylic acid reagent, provided that the blended polymer is free of other polymers of vinyl aromatic hydrocarbons.

2. The polymer composition of claim 1 comprising from about 70% to 90% by weight of (I).

3. The polymer composition of claim 1 wherein the polyamide (II) is selected from the group consisting of polyhexamethylene adipamide, polyhexamethylene sebacamide, polycaprolactam, polyhexamethylene isophthalamide, polyhexamethylene tere-co-isophthalamide, polytetramethylene adipamide and mixtures thereof.

4. The polymer composition of claim 1 wherein the terpolymer (III) comprises from about 60% to about 94% by weight of the olefin, from about 5% to about 40% by weight of the acrylic ester and from about 1% to about 10% by weight of the dicarboxylic acid reagent or the glycidyl acrylate.

5. The polymer composition of claim 1 wherein the alpha-olefin of (III) contains from 2 to about 6 carbon atoms.

6. The polymer composition of claim 1 wherein the alpha-olefin of (III) is ethylene, propylene or a mixture thereof.

7. The polymer composition of claim 1 wherein the acrylic ester of (III) is characterized by the formula $$CH_2=C(R)COOR'$$

wherein R is hydrogen, or a methyl or ethyl group, and R' is an alkyl group containing 1 to about 6 carbon atoms.

8. The polymer composition of claim 1 wherein the dicarboxylic acid reagent of (III) is maleic anhydride.

9. The polymer composition of claim 1 wherein the block copolymer of (IV) prior to hydrogenation is a styrene-butadiene-styrene block copolymer.

10. The polymer composition of claim 1 wherein the hydrogenated block copolymer of (IV) is a selectively hydrogenated block copolymer of the formula $$B_n(AB)_oA_p$$

wherein
   n = 0 or 1;
   o = 1 to 100;
   p = 0 or 1;
   each B prior to hydrogenation is predominantly a polymerized conjugated diene hydrocarbon block having a number average molecular weight of about 20,000 to about 450,000;
   each A is predominantly a polymerized monoalkenyl aromatic hydrocarbon block having a number average molecular weight of about 2000 to about 115,000; the blocks of A constituting about 5% to about 95% by weight of the copolymer; and the unsaturation of the block B is less than about 10% of the original unsaturation.

11. The polymer composition of claim 10 wherein the unsaturation of block B is reduced to less than 5% of its original value and the average unsaturation of the hydrogenated block copolymer is reduced to less than 20% of its original value.

12. The polymer composition of claim 10 wherein A is a polymerized styrene block having a number average molecular weight of between about 4000 and about 60,000.

13. The polymer composition of claim 10 wherein B is a polymerized butadiene block having a number average molecular weight of between about 35,000 and about 150,000, and 35% to 50% of the condensed butadiene units have a 1,2-configuration.

14. The polymer composition of claim 1 wherein the hydrogenated block copolymer of (IVa) has been grafted with from about 0.2% to about 20% by weight of the carboxylic acid reagent.

15. The polymer composition of claim 1 wherein the carboxylic acid reagents of (IV) are dicarboxylic acids, anhydrides, imides, half esters, metal salts, or mixtures thereof.

16. The polymer composition of claim 15 wherein the carboxylic acid reagent is maleic acid.

17. A blended polymer composition comprising:

(I) from about 30% to about 90% by weight of at least one polypropylene or copolymer of ethylene and propylene;

(II) from about 5% to about 25% by weight of at least one polyamide;

(III) from about 0.1% to about 2.5% of a compatibilizing agent which comprises at least one terpolymer of an alpha-olefin, an acrylic ester, and an alpha,beta-olefinically unsaturated dicarboxylic acid reagent, or a glycidyl acrylate; and (IV) from 0.1% to about 2.5% by weight of at least one auxiliary compatibilizing agent selected from at least one selectively hydrogenated styrene-ethylene-butylene-styrene block copolymer to which has been grafted, an alpha,beta-olefinically unsaturated carboxylic acid reagent, provided that the blended polymer is free of other polymers of vinyl aromatic hydrocarbons.

18. A blended polymer composition comprising:

(I) from about 30% to about 90% by weight of at least one polypropylene or copolymer of ethylene and propylene;

(II) from about 5% to about 25% by weight of at least one polyamide;

(III) from about 0.1% to about 2.5% of a compatibilizing agent which comprises at least one terpolymer of an alpha-olefin, an acrylic ester, and an alpha,beta-olefinically unsaturated dicarboxylic acid reagent, or a glycidyl acrylate; and (IV) from 0.1% to about 2.5% by weight of at least one auxiliary compatibilizing agent selected from at least one selectively hydrogenated block copolymer of a vinyl aromatic hydrocarbon and a conjugated diene to which has been grafted, an alpha,-beta-olefinically unsaturated carboxylic acid reagent, provided that the blended polymer is free of other polymers of vinyl aromatic hydrocarbons.

19. A blended polymer composition which comprises:

(I) from about 70% to about 90% by weight of at least one polypropylene;

(II) from about 5% to about 25% by weight of at least one polyamide having a number average molecular weight of at least about 5000;

(III) from about 0.1 to about 25% by weight of at least one terpolymer of (i) ethylene or propylene, (ii) an acrylic ester, and (iii) maleic acid, maleic anhydride or glycidyl acrylate; and (IV) from about 0.1 to about 10% of at least one auxiliary compatibilizer selected from the group consisting of (IVa) at least one selectively hydrogenated block copolymer of a vinyl aromatic hydrocarbon and an aliphatic conjugated diene to which has been grafted an alpha, beta-olefinically unsaturated monocarboxylic or dicarboxylic acid reagent provided that the blended polymer is free of any other polymers of vinyl aromatic hydrocarbons.

20. The polymer composition of claim 19 wherein the polyamide (II) is selected from the group consisting of polyhexamethylene adipamide, polyhexamethylene sebacamide, polyhexamethylene tere-co-isophthalamide, polytetramethylene adipamide and mixtures thereof.

21. The polymer composition of claim 19 wherein the terpolymer (III) comprises from about 60% to about 94% by weight of ethylene, propylene or a mixture thereof, from about 5% to about 40% by weight of the acrylic ester and from about 1% to about 5% by weight of maleic acid or maleic anhydride.

22. The polymer composition of claim 19 wherein the block copolymer of (IVa) prior to hydrogenation is a styrene-butadiene-styrene block copolymer.

23. The polymer composition of claim 19 wherein the hydrogenated block copolymer of (IVa) is a selectively hydrogenated block copolymer of the formula $$B_n(AB)_oA_p$$

wherein $n = 0$ or 1;

$o = 1$ to 100;

$p = 0$ or 1;

each B prior to hydrogenation is predominantly a polymerized conjugated diene hydrocarbon block having a number average molecular weight of about 20,000 to about 450,000;

each A is predominantly a polymerized monoalkenyl aromatic hydrocarbon block having a number average molecular weight of about 2000 to about 115,000; the blocks of A constituting about 5% to about 95% by weight of the copolymer; and the unsaturation of the block B is less than about 10% of the original unsaturation.

24. The polymer composition of claim 23 wherein the unsaturation of block B is reduced to less than 5% of its original value and the average unsaturation of the hydrogenated block copolymer is reduced to less than 20% of its original value.

25. The polymer composition of claim 23 wherein A is a polymerized styrene block having a number average molecular weight of between about 4000 and about 60,000.

26. The polymer composition of claim 23 wherein B is a polymerized butadiene block having a number average molecular weight of between about 35,000 and about 150,000, and 35% to 50% of the condensed butadiene units have a 1,2-configuration.

27. The polymer composition of claim 19 wherein the hydrogenated block copolymer of (IVa) has been grafted with from about 0.2% to about 20% by weight of the carboxylic acid reagent.

* * * * *